(12) United States Patent
Weng et al.

(10) Patent No.: US 9,279,999 B1
(45) Date of Patent: Mar. 8, 2016

(54) GLASSES CAPABLE OF REPLACING LENSES AND TEMPLES

(71) Applicant: HWA MEEI OPTICAL CO., LTD., Tainan (TW)

(72) Inventors: Ling-Ying Weng, Tainan (TW); Yu-Chieh Hsu, Chiayi (TW); Mei-Hui Chen, Tainan (TW)

(73) Assignee: Hwa Meei Optical Co., Ltd., Tainan (TW)

( * ) Notice: Subject to any disclaimer, the term of this patent is extended or adjusted under 35 U.S.C. 154(b) by 0 days.

(21) Appl. No.: 14/535,363

(22) Filed: Nov. 7, 2014

(51) Int. Cl.
*G02C 5/22* (2006.01)
*G02C 1/04* (2006.01)
*G02C 5/20* (2006.01)

(52) U.S. Cl.
CPC ............... *G02C 5/2209* (2013.01); *G02C 1/04* (2013.01); *G02C 5/20* (2013.01); *G02C 2200/08* (2013.01)

(58) Field of Classification Search
CPC .............. G02C 1/04; G02C 1/10; G02C 5/14; G02C 5/146; G02C 5/22; G02C 5/2209; G02C 5/2263; G02C 2200/06

USPC ................. 351/103–109, 140, 153, 154
See application file for complete search history.

(56) References Cited

U.S. PATENT DOCUMENTS

| 9,004,679 B2 * | 4/2015 | Chen | G02C 1/04 351/103 |
| 2015/0022774 A1 * | 1/2015 | Chen | G02C 1/04 351/57 |

* cited by examiner

*Primary Examiner* — Huy K Mai
(74) *Attorney, Agent, or Firm* — Alan D. Kamrath; Kamrath IP Lawfirm, P.A.

(57) ABSTRACT

A pair of glasses includes a front frame, at least one lens, two temples, and two elongated couplers. The front frame is formed with two connection blocks at its two opposite ends. The front side of each connection block defines a cut. The rear side of each connection block is provided with two spaced lugs. The lens defines a cut corresponding to the cut of one connection block of the front frame. The front end of each temple is provided with a pivot pin that can be detachably fitted in the through-holes of the lugs of the connection block and the rear end of the elongated coupler, so that each temple is foldable relative to the front frame. The front end of each elongated coupler is provided with a hooked portion that can be detachably fitted into the cuts of the lens and connection block to install the lens.

6 Claims, 9 Drawing Sheets and includes a front frame 12, two lenses 14, two

GLASSES CAPABLE OF REPLACING LENSES AND TEMPLES

BACKGROUND OF THE INVENTION

1. Field of the Invention

The present invention relates to a pair of glasses and, more particularly, to a pair of glasses that can be replaced with lenses and temples more conveniently.

2. Description of the Related Art

With the upgrading of material life, people who pursue innovation and change pay more and more attention on portable decorative items, such as glasses. For increasing the aesthetic appearance and matching the clothes, sunglasses or casual glasses are gradually employed. Because sunglasses or casual glasses focus on fancy and a variety of changes, users often change the temples and/or the lenses of their glasses so as to match their moods and clothes. However, the existing sunglasses or casual glasses are difficult to replace their temples and lens. Even worse, users require replacing the entire glasses for changing the temples or lens, and this is uneconomical.

Generally, conventional glasses include a front frame, two lenses, and two temples pivotally connected to the front frame, wherein the front frame defines two slots for receiving the two lenses. In assembling the lenses, the lenses should be forced to be inserted into the slots of the front frame being somewhat of elasticity, the lenses may be broken or the front frame may be damaged during the assembling process. Furthermore, in conventional glasses, screws are usually employed to connect the temples and the front frame to allow the temples to be folded or unfolded relative to the front frame. Therefore, when a replacement for the temples is required, the user should use a screwdriver to unfasten the screw, and after new temples is positioned with the front frame, the user should also use the screwdriver to fasten the screw. The way of replacing the temples or lenses is inconvenient and time-consuming.

BRIEF SUMMARY OF THE INVENTION

Thus, an objective of the present invention is to provide a pair of glasses that can be replaced with temples and lenses more conveniently to prolong the product life and increase its performance.

To achieve this and other objectives, a pair of glasses of the present invention includes a front frame, at least one lens, two temples, and two elongated couplers. The front frame includes at least one lens-mounting slot and is formed with two connection blocks at its two opposite ends. Each connection block defines a slot segment at its front side and is provided with two spaced-apart lugs at its rear side. Each slot segment is a portion of the at least one lens-mounting slot. Each connection block further defines a lengthwise groove and a cut in its inner lateral side. The cut communicates with the slot segment, and the lengthwise groove terminates at the cut. Each of the spaced-apart lugs defines a through-hole and a first entrance opening communicating with the through-hole. Each connection block further defines, at its front side, an engagement recess extending from the slot segment at the same height as the cut. The lens is engaged in the lens-mounting slot and includes a cut formed in one lateral edge thereof and corresponding to the cut of one of the two connection blocks of the front frame. Each temple is detachably coupled to the front frame. A front end of each temple is provided with a pivot pin which is fitted in the through-holes of the spaced-apart lugs of a corresponding connection block via the first entrance openings of the corresponding connection block, so that each temple is foldable relative to the front frame. Each elongated couple is mounted to the lengthwise groove of one corresponding connection block of the front frame for connecting the front frame and one of the temples. Each elongated coupler includes spaced front and rear ends. The front end of each elongated coupler is formed with a hooked portion which is capable of being engaged in the cuts of the corresponding connection block and the corresponding lens. A tip of the hooked portion is engaged in the engagement recess of the corresponding connection block to assemble the lens to the front frame. The rear end of each elongated coupler defines a through-hole and a second entrance opening communicating with the though hole thereof. The rear end of the elongated coupler is fitted between the spaced-apart lugs of the corresponding connection block, and the pivot pin is fitted in the through-hole of the rear end of the elongated coupler via the second entrance opening thereof. The second entrance opening of the rear end of the elongated coupler is offset from the first entrance openings of the corresponding connection block. The elongated coupler is capable of being rotated by using the tip of the hooked portion as a center to move away from the pivot pin and thus detach the corresponding temple. The elongated coupler is capable of being rotated by using the pivot as a center to move away from the cuts of the corresponding lens and the corresponding connection block and thus dismantle the corresponding lens.

In a preferred form, the front frame includes two eyewires and a bridge between the two eyewires. The front side of each connection block faces towards the bridge. The front frame includes two lens-mounting slots, and each eyewire defines one of the lens-mounting slots. Each lens-mounting slot extends along the corresponding eyewire from the bridge to the front side of the corresponding connection block.

The present invention will become clearer in light of the following detailed description of illustrative embodiments of this invention described in connection with the drawings.

DESCRIPTION OF THE DRAWINGS

The illustrative embodiments may best be described by reference to the accompanying drawings where.

DETAILED DESCRIPTION OF THE INVENTION

Figure 1:
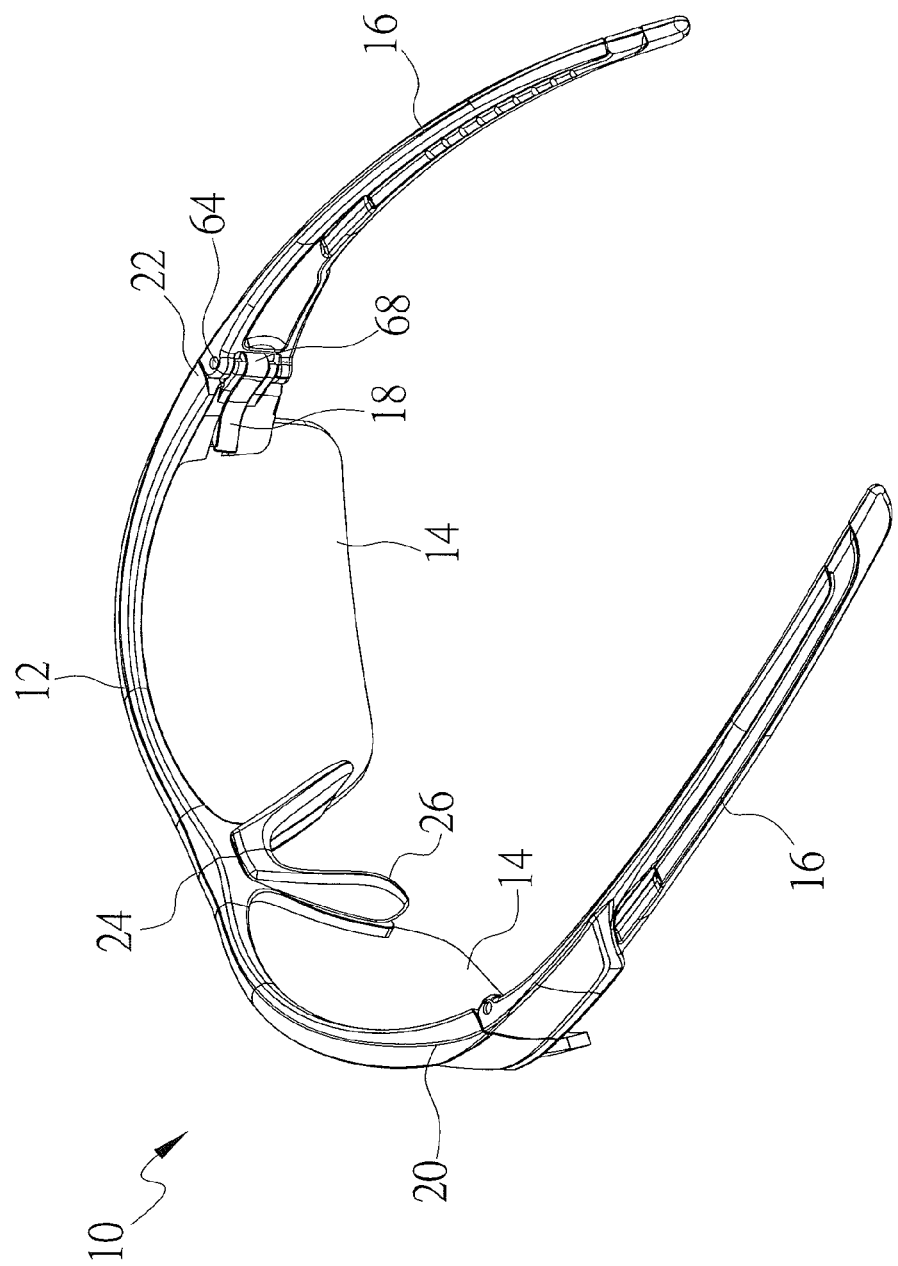
FIG. 1 shows a 3-dimensional view of a pair of glasses of one embodiment of the present invention.
Figure 2:
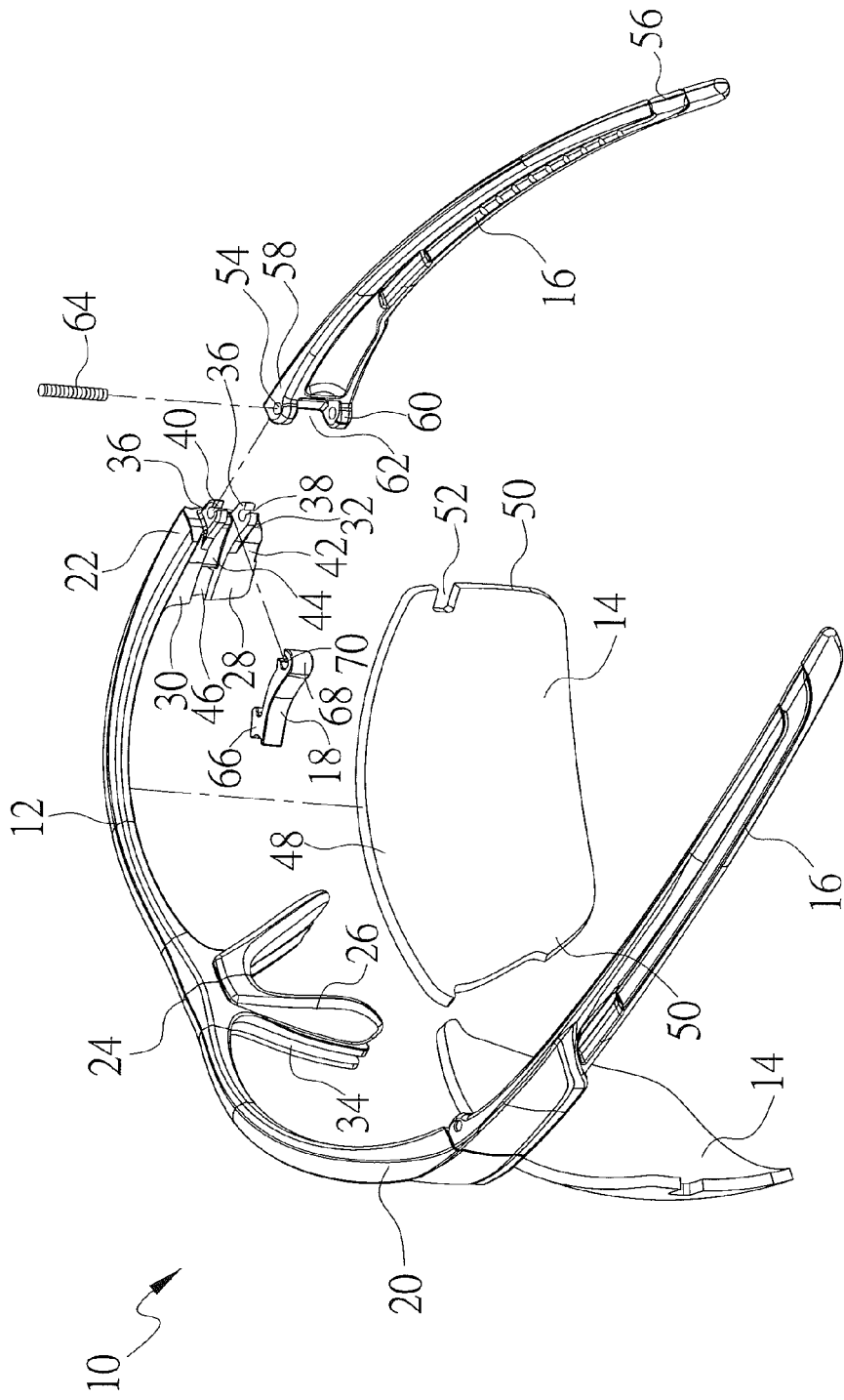
FIG. 2 shows an exploded view of the glasses of FIG. 1.

A pair of glasses 10 according to the preferred teachings of the present invention is shown in FIGS. 1 through 8 of the drawings and includes a front frame 12, two lenses 14, two temples 16, and two elongated couplers 18. The glasses 10 can be used as sunglasses, protective glasses, sports glasses, glasses for correcting myopia, glasses for correcting hyperopia, reading glasses, and so on. The front frame 12 can be made of a suitable material, for example, metal, alloy, or plastic. The temples 16 and the elongated couplers 18 can be made of plastic, rubber, or metal.

The front frame 12 includes two eyewires (left and right eyewires) and a bridge 24 formed between the two eyewires. The bottom of the bridge 24 is formed with two opposite nose pads 26. The left eyewire has a first end 20 opposite to the bridge 24, while the right eyewire has a second end 22 opposite to the bridge 24 (see FIG. 4). In other words, the first and second ends 20 and 22 are at two opposite ends of the front frame 12. The front frame 12 is formed with two connection blocks 28 respectively at the first end 20 and the second end 22. Specifically, the two connection blocks 28 are respectively formed at the bottoms of the first and second ends 20 and 22. Each connection block 28 has a front side 30 and a rear side 32. The front frame 12 is configured such that the front side 30 of each connection block 28 faces towards the bridge 24. Each eyewire defines a lens-mounting slot 34 for mounting one of the lenses 14, wherein each of the lens-mounting slots 34 extends along the corresponding eyewire from the bridge 24 to the front side 30 of the corresponding connection block 28. In the embodiment, the front side 30 of each connection block 28 defines a slot segment, which is a portion of an entire lens-mounting slot 34 of the front frame 12 and thus indicated by the same reference numeral 34. The rear side 32 of each connection block 28 is provided with two spaced-apart lugs 36. Each lug 36 defines a through-hole 38 and an entrance opening 40 communicating with the through-hole 38. Furthermore, the inner lateral side 42 of each connection block 28 defines a lengthwise groove 44 for receiving one elongated coupler 18 and defines a cut 46 at which the lengthwise groove 44 terminates. The cut 46, which is near the front side 30 of the connection block 28, communicates with the slot segment 34. Furthermore, the front side 30 of each connection block 28 defines an engagement recess 47, which extends from the slot segment 34 towards the interior of the connection block 28, at the same height as the cut 46 (see FIG. 4).

Each lens 14 has a top edge 48 and two lateral edges 50, all of which can be inserted into one lens-mounting slot 34 of the front frame 12. The lateral edge 50 of each lens 14 defines a cut 52 corresponding to the cut 46 of the corresponding connection block 28. As such, when each lens 14 is inserted into the corresponding lens-mounting slot 34, the cut 52 of each lens 14 will be aligned with the cut 46 of the corresponding connection block 28.

Each temple 16 has a front end 54 and a rear end 56. The front end 54 of each temple 16 can be detachably coupled to the front frame 12. The rear end 56 of each temple 16 can be placed over one ear of a user. In the embodiment, the front end 54 of each temple 16 is provided with two spaced-apart projections 58, 60, between which a space 62 is defined. The space 62 allows the two spaced-apart lugs 36 to be fitted between the two spaced-apart projections 58, 60. Furthermore, a pivot pin 64 is connected between the two spaced-apart projections 58, 60. For example, the pivot pin 64 can be a threaded pin while each of the projections 58, 60 defines a threaded hole, wherein the pivot pin 64 can be threaded engaged with the threaded holes of the projections 58, 60. As such, the pivot pin 64 can be fitted in the through-holes 38 of the connection block 28 via the correspond entrance openings 40, so that each temple 16 is capable of rotating about the corresponding pivot pin 64 and thus is foldable relative to the front frame 12.

Figure 9:
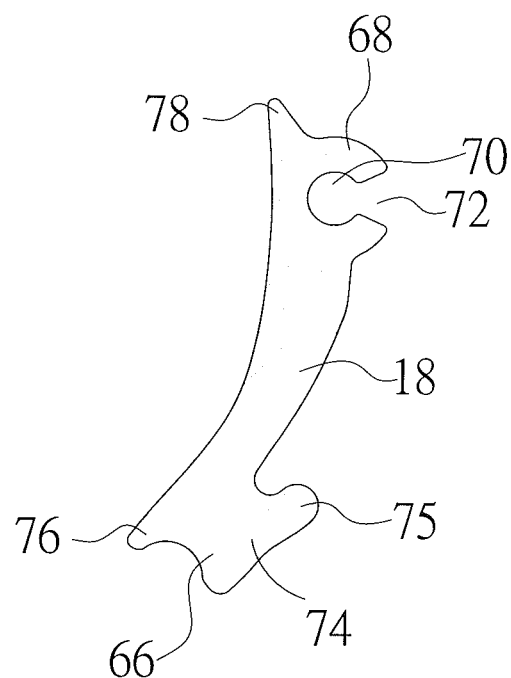
FIG. 9 shows a sectional view of a modified elongated coupler used in the glasses of the present invention.

Each elongated coupler 18, which has a front end 66 and a rear end 68, is mounted to the lengthwise groove 44 of one corresponding connection block 28 of the front frame 12 for connecting the front frame 12 and one of the temples 16. The front end 66 of each elongated coupler 18 is detachably connected with one corresponding connection block 28 of the front frame 12, while the rear end 68 of each elongated coupler 18 is detachably connected with one corresponding temple 16. The rear end 68 of each elongated coupler 18 defines a through-hole 70 and an entrance opening 72 communicating with the through-hole 70. The rear end 68 of each elongated coupler 18 is fitted between the two spaced-apart lugs 36 of the corresponding connection block 28 such that the pivot pin 64 is fitted in the through-hole 70 of the rear end 68 of the elongated coupler 18 via the entrance opening 72 thereof, wherein the entrance opening 72 of the rear end 68 of the elongated coupler 18 is offset from the entrance openings 40 of the two spaced-apart lugs 36 of the connection block 28 (see FIGS. 4 and 8), so as to prevent the temple 16 from being detached from the front frame 12. The front end 66 of each elongated coupler 18 is formed with a hooked portion 74 which can be inserted into the cuts 46, 52 of the corresponding connection block 28 and the corresponding lens 14, wherein the tip 75 of the hooked portion 74 is engaged in the engagement recess 47 extending from the slot segment 34 of the connection block 28 so as to assemble the lens 14 to the front frame 12. For detaching the temple 16 from the front frame 12, the elongated coupler 18 can be rotated by using the tip 75 of the hooked portion 74 as a center to move away from the pivot pin 64 (see FIG. 7). For dismantling the lens 14, the elongated coupler 18 can be rotated by using the pivot pin 64 as a center to move away from the cuts 46, 52 of the corresponding connection block 28 and the corresponding lens 14 (see FIG. 4). Furthermore, the front end 66 of each elongated coupler 18 can be formed with a front protrusion 76 for facilitating a user to operate the elongated coupler 18. Furthermore, in addition to the front protrusion 76, the rear end 68 of each elongated coupler 18 can be formed with a rear protrusion 78 for facilitating a user to operate the elongated coupler 18 (see FIG. 9).

Figure 3:
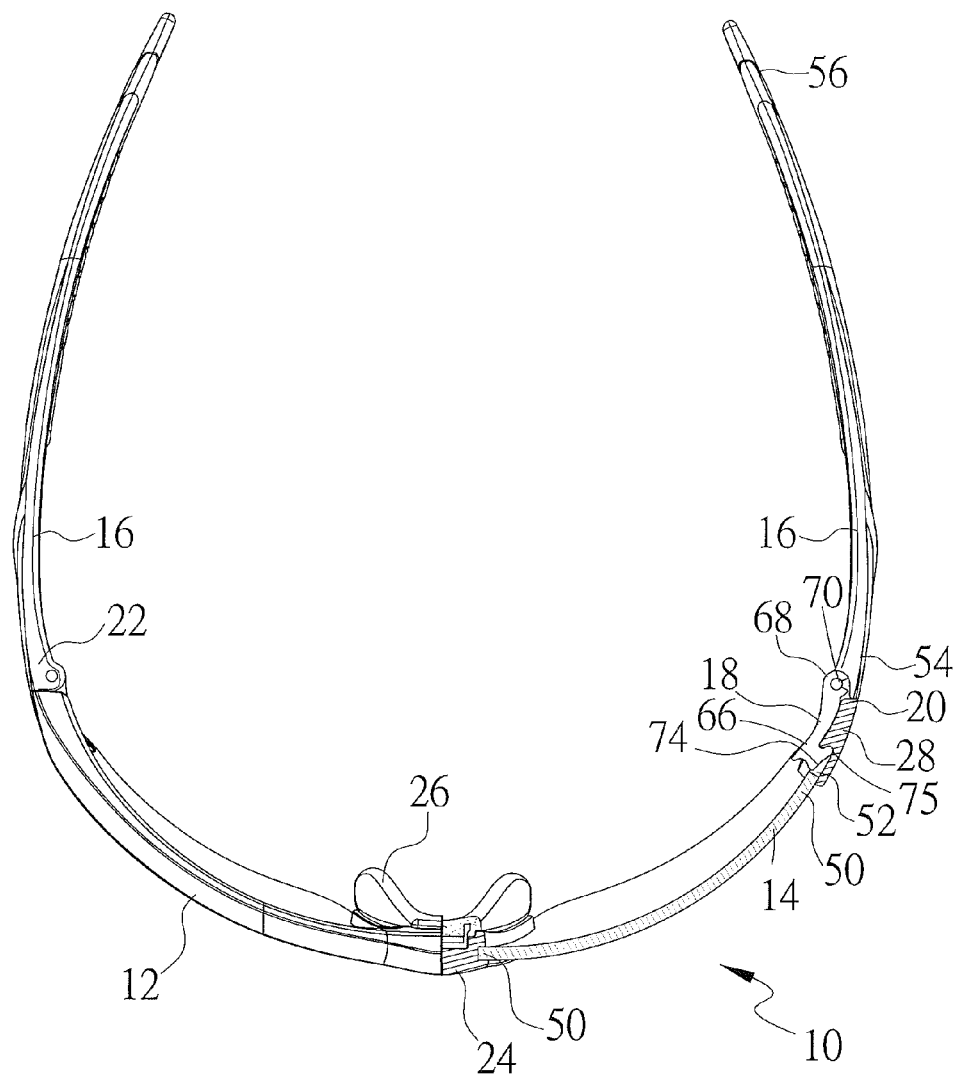
FIG. 3 shows a top view of the glasses of FIG. 1.
Figure 4:
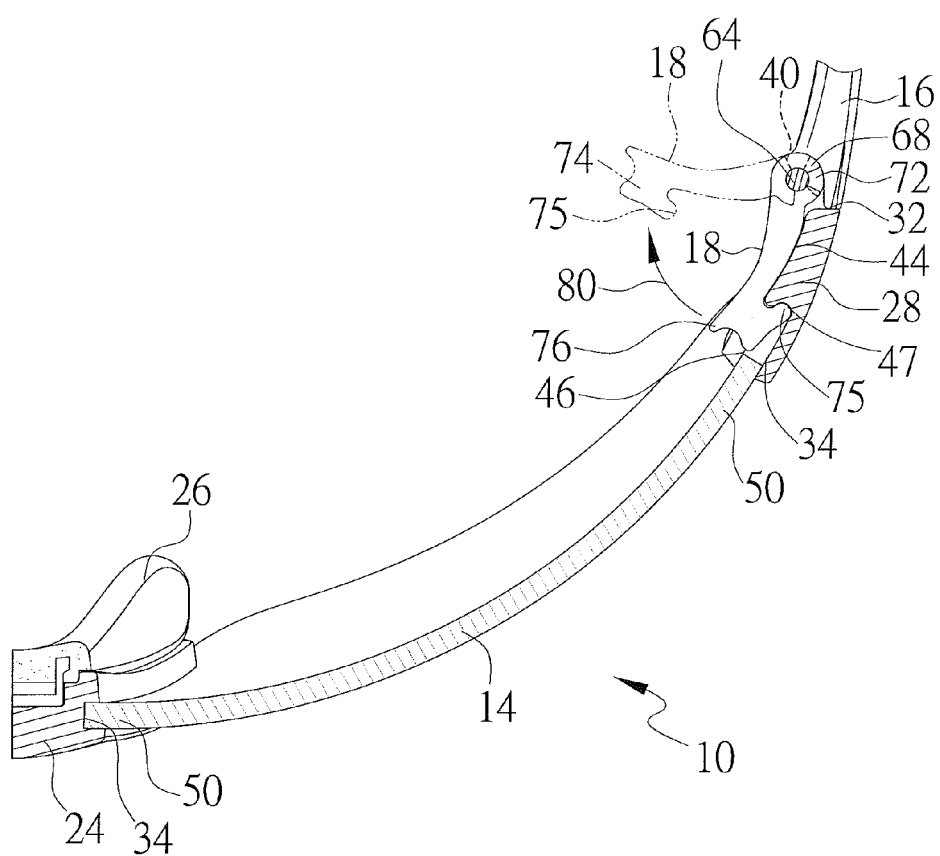
FIG. 4 shows an enlarged partial view of the glasses of FIG. 3, wherein the elongated coupler is being moved away from the cut of the corresponding lens.
Figure 5:
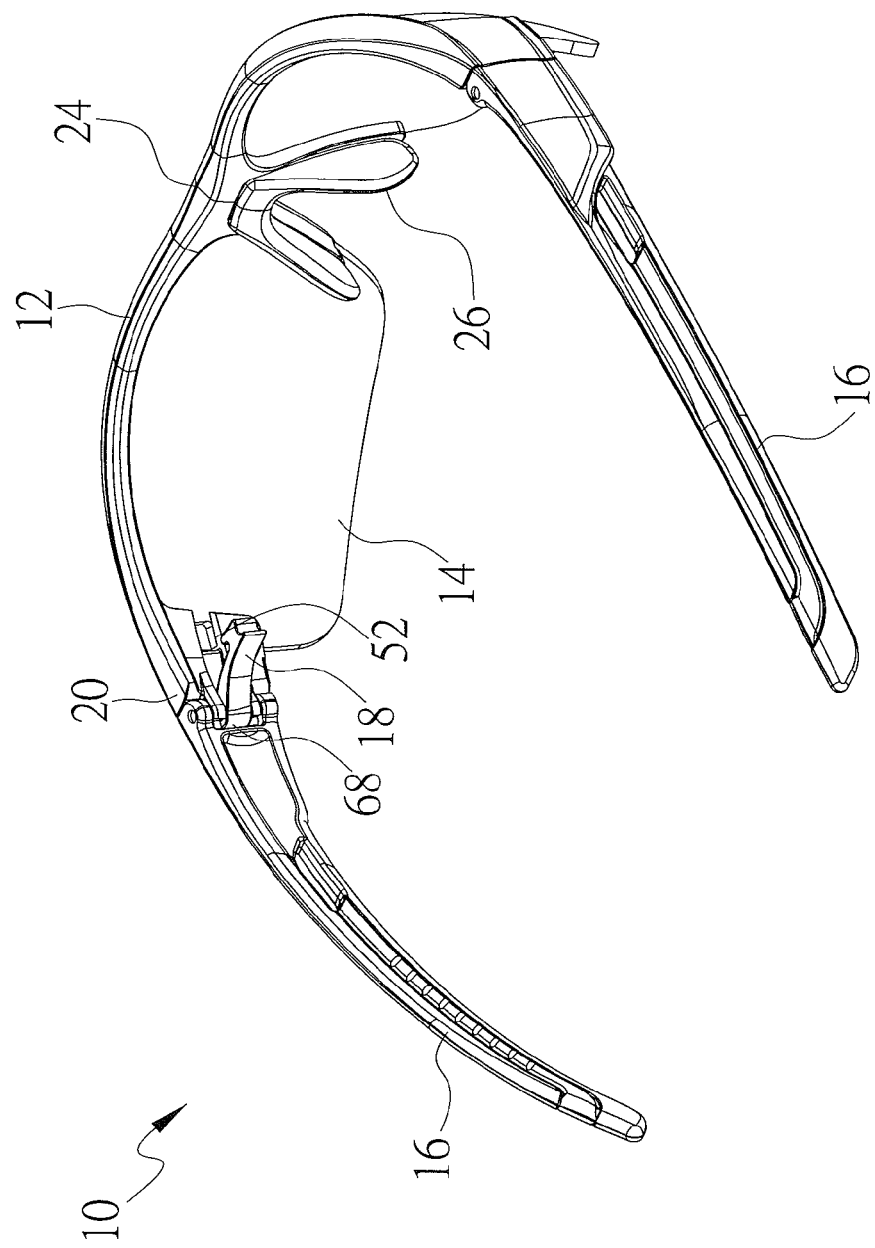
FIG. 5 shows another 3-dimensional view of the glasses of FIG. 1, wherein one lens is in an unfastened state.
Figure 6:
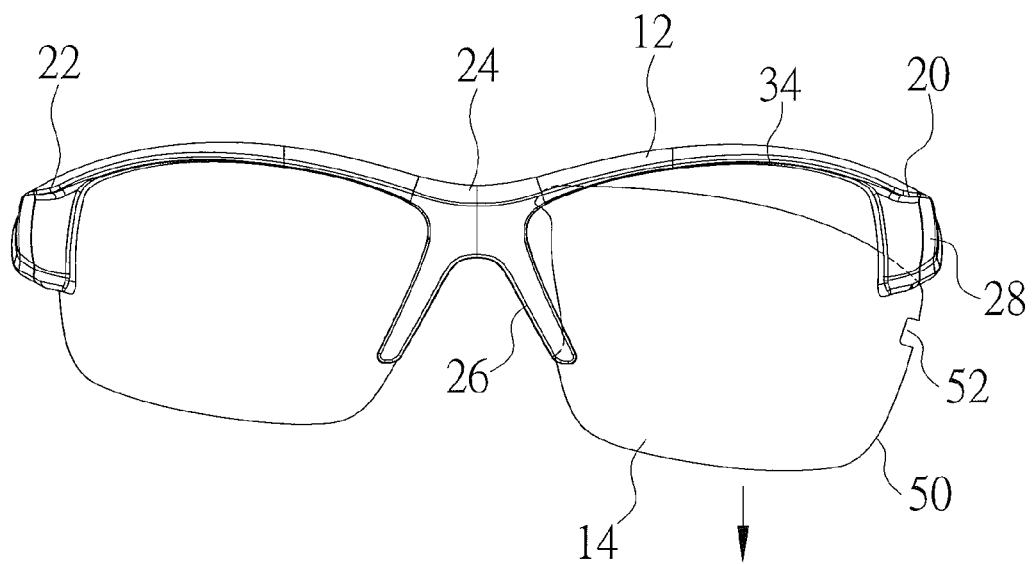
FIG. 6 shows a front view of the glasses of FIG. 1, wherein the unfastened lens is being taken apart from the front frame.
Figure 7:
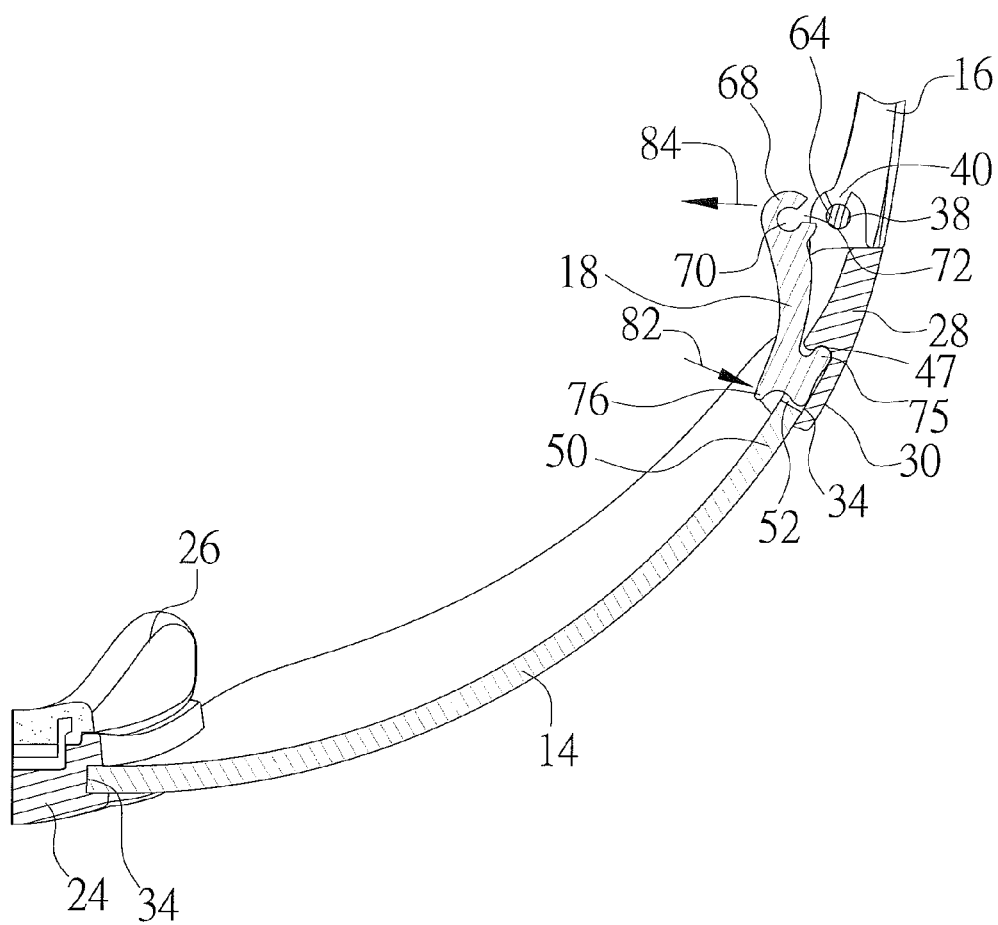
FIG. 7 shows an enlarged partial view of the glasses of FIG. 3, wherein the elongated coupler is being moved away from the pivot pin of the temple.
Figure 8:
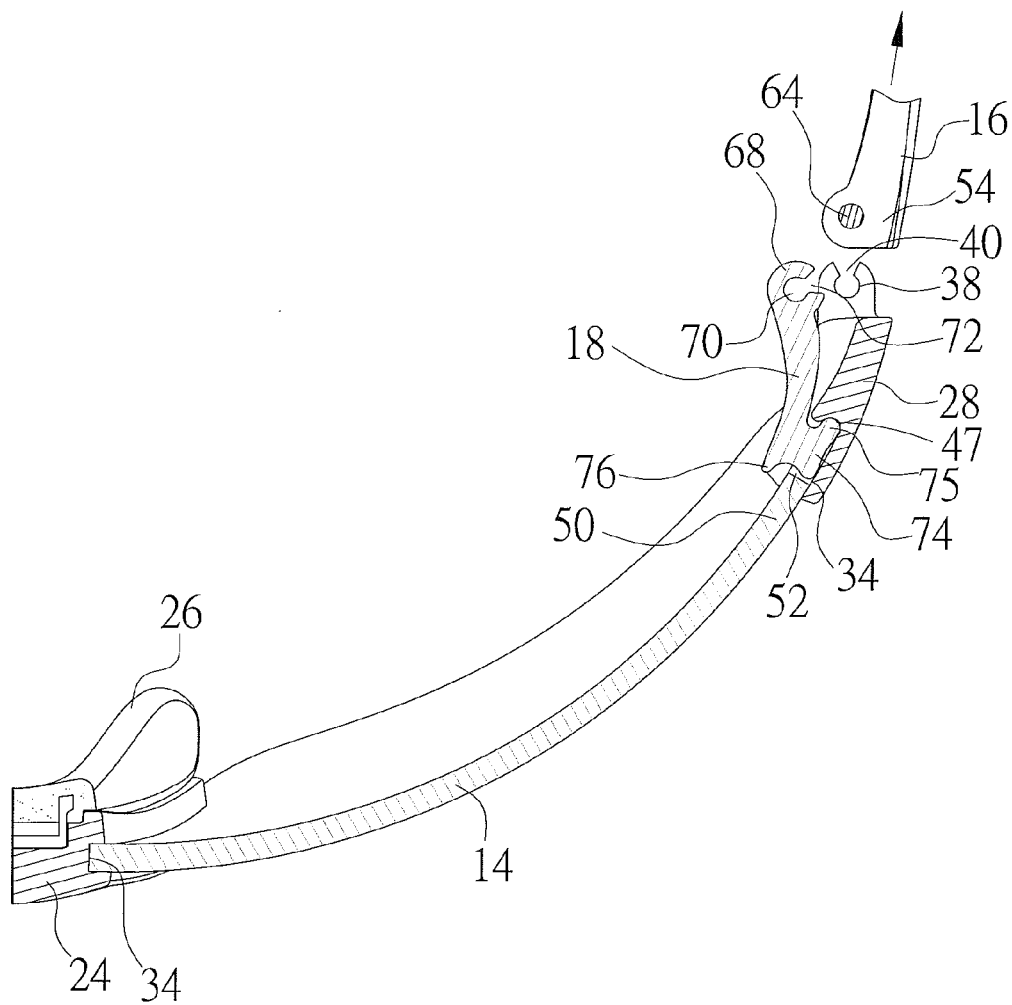
FIG. 8 shows an enlarged partial view of the glasses of FIG. 3, wherein the temple is being taken apart from the front frame.

FIG. 3 shows the connection relationship among the front frame 12, the lens 14, the temple 16, and the elongated coupler 18, wherein the rear end 68 of the elongated coupler 18 is used to couple the temple 16 with the front frame 12; the front end 66 of the elongated coupler 18 is used to assemble the lens 14 to the front frame 12. With the glasses of the present invention, replacing the lens 14 and the temple 16 is convenient. In replacing the lens 14, a user only requires to rotate the elongated coupler 18 in the direction of the arrow 80 (see FIG. 4) to have the hooked portion 74 thereof been clear of the cuts 46, 52 of the corresponding connection block 28 and the corresponding lens 14, and thus the lens 14 can be dismantled from the front frame 12 for a replacement (see FIG. 6). On the other hand, in assembling a lens 14 to the front frame 12, the user can first insert the lens 14 into one corresponding lens-mounting slot 34 of the front frame 12 and then operate the corresponding elongated coupler 18 to have the hooked portion 74 thereof inserted into the cuts 46, 52 of the corresponding connection block 28 and the corresponding lens 14. Furthermore, in detaching the temple 16 from the front frame 12, the user only requires to press the front protrusion 76 at the front end 66 of the corresponding elongated coupler 18 in the direction of the arrow 82 (see FIG. 7) to have the rear end 68 to move away from the pivot pin 64 (shown by the arrow 84 in FIG. 7), and then the temple 16 can be detached from the front frame 12 (see FIG. 8). On the other hand, in mounting a temple 16 to the front frame 12, the user can first fit the pivot pin 64 in the through-holes 38 of the corresponding lugs 36 of the front frame 12, and then operate the corresponding elongated coupler 18 to have the pivot pin 64 fitted in the through-hole 70 of the corresponding elongated coupler 18. With the glasses of the present invention, the lenses and temples can be replaced conveniently.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. A pair of glasses, comprising:

a front frame including at least one lens-mounting slot and formed with two connection blocks at its two opposite ends, with each connection block defining a slot segment at its front side and provided with two spaced-apart lugs at its rear side, with each slot segment being a portion of the at least one lens-mounting slot, with each connection block further defining a lengthwise groove and a cut in its inner lateral side, wherein the cut communicates with the slot segment, the lengthwise groove terminates at the cut, each of the spaced-apart lugs defines a through-hole and a first entrance opening communicating with the through-hole, and each connection block further defines an engagement recess formed in its front side and extending from the slot segment at the same height as the cut;

at least one lens engaged in the at least one lens-mounting slot and including a cut formed in one lateral edge thereof and corresponding to the cut of one of the two connection blocks of the front frame;

two temples each detachably coupled to the front frame, wherein a front end of each temple is provided with a pivot pin, with the pivot pin fitted in the through-holes of the spaced-apart lugs of a corresponding connection block via the first entrance openings of the corresponding connection block, wherein each temple is foldable relative to the front frame; and two elongated couplers each mounted to the lengthwise groove of one corresponding connection block of the front frame for connecting the front frame and one of the two temples, with each elongated coupler including spaced front and rear ends, wherein the front end of each elongated coupler is formed with a hooked portion which is capable of being engaged in the cuts of the corresponding connection block and the corresponding lens, wherein a tip of the hooked portion is engaged in the engagement recess of the corresponding connection block to assemble the lens to the front frame, with the rear end of each elongated coupler defining a through-hole and a second entrance opening communicating with the though hole thereof, with the rear end of the elongated coupler fitted between the two spaced-apart lugs of the corresponding connection block, wherein the pivot pin is fitted in the through-hole of the rear end of the elongated coupler via the second entrance opening thereof, wherein the second entrance opening of the rear end of the elongated coupler is offset from the first entrance openings of the corresponding connection block, wherein the elongated coupler is capable of being rotated by using the tip of the hooked portion as a center to move away from the pivot pin and thus detach the corresponding temple, wherein the elongated coupler is capable of being rotated by using the pivot as a center to move away from the cuts of the corresponding lens and the corresponding connection block and thus dismantle the corresponding lens.

2. The glasses of claim 1, wherein the front frame includes two eyewires and a bridge formed between the two eyewires, with the front side of each connection block facing towards the bridge, with the front frame including two lens-mounting slots, with each eyewire defining one of the two lens-mounting slots, with each lens-mounting slot extending along the corresponding eyewire from the bridge to the front side of the corresponding connection block.

3. The glasses of claim 2, wherein the front end of each temple is provided with two spaced-apart projections for connecting one of the pivot pins therebetween, with the two spaced-apart lugs of each connection block of the front frame fitted between the two spaced-apart projections of one corresponding temple.

4. The glasses of claim 2, wherein the front end of each elongated coupler is formed with a front protrusion for facilitating a user to operate the elongated coupler.

5. The glasses of claim 2, wherein the front end of each elongated coupler is formed with a front protrusion while the rear end of each elongated coupler is formed with a rear protrusion for facilitating a user to operate the elongated coupler.

6. The glasses of claim 2, wherein the two connection blocks are respectively formed at bottoms of the two opposite ends of the front frame.

\* \* \* \* \*